(12) United States Patent
Finkenzeller (10) Patent No.: US 8,797,163 B2
(45) Date of Patent: Aug. 5, 2014

(54) TRANSPONDER UNIT (75) Inventor: Klaus Finkenzeller, Unterföhring (DE)

(73) Assignee: Giesecke & Devrient GmbH, Munich (DE)

( * ) Notice: Subject to any disclaimer, the term of this patent is extended or adjusted under 35 U.S.C. 154(b) by 1624 days.

(21) Appl. No.: 11/631,037

(22) PCT Filed: Jun. 27, 2005

(86) PCT No.: PCT/EP2005/006904
§ 371 (c)(1),
(2), (4) Date: Jan. 28, 2008

(87) PCT Pub. No.: WO2006/000446
PCT Pub. Date: Jan. 5, 2006

(65) Prior Publication Data
US 2009/0040022 A1    Feb. 12, 2009

(30) Foreign Application Priority Data
Jun. 28, 2004 (DE) .................. 10 2004 031 092

(51) Int. Cl.
*G08B 13/14* (2006.01)

(52) U.S. Cl.
USPC ............. 340/572.2; 340/10.1; 340/572.4

(58) Field of Classification Search
None
See application file for complete search history.

(56) References Cited

U.S. PATENT DOCUMENTS

| | | | |
|---|---|---|---|
| 3,206,746 A * | 9/1965 | Beyersdorf et al. ........ 342/44 |
| 3,636,544 A * | 1/1972 | Codina ............... 340/539.26 |
| 4,179,657 A * | 12/1979 | Hobbs ...................... 380/34 |
| 5,030,962 A | 7/1991 | Rees |
| 5,698,837 A | 12/1997 | Furuta |
| 5,936,527 A * | 8/1999 | Isaacman et al. ........ 340/572.1 |
| 6,003,777 A | 12/1999 | Kowalski |
| 6,046,683 A * | 4/2000 | Pidwerbetsky et al. ...... 340/10.4 |
| 6,130,602 A * | 10/2000 | O'Toole et al. .......... 340/10.33 |
| 6,140,982 A * | 10/2000 | Fuchter et al. ............. 345/45 |
| 6,229,443 B1 * | 5/2001 | Roesner ................ 340/572.1 |
| 6,463,039 B1 * | 10/2002 | Ricci et al. .............. 370/277 |
| 6,559,754 B1 | 5/2003 | Amtmann |
| 6,624,780 B1 | 9/2003 | Fouts et al. |
| 6,685,096 B1 * | 2/2004 | Degrauwe et al. ........ 235/492 |

(Continued)

FOREIGN PATENT DOCUMENTS

DE    32 08 812 A1    5/1995
DE    198 00 565 A1    7/1999

(Continued)

OTHER PUBLICATIONS

Duhs, WO 00/74406 A1, Dec. 7, 200, WIPO, pp. 1-24.*

(Continued)

*Primary Examiner* — Nabil Syed
*Assistant Examiner* — Brian Wilson
(74) *Attorney, Agent, or Firm* — Workman Nydegger (57) ABSTRACT

The invention relates to a transponder unit (1) and to a method for transmitting data between the transponder unit and a reader (100). The aim of the invention is to increase the transmission range of the transponder unit (1) to the reader (100). For this purpose, means are integrated into the transponder unit (1) for actively transmitting a signal to the reader (100). The reader (100) evaluates said signal as a modulation of its own field (110) by a transponder.

18 Claims, 6 Drawing Sheets

(56) References Cited

U.S. PATENT DOCUMENTS

| | | | |
|---|---|---|---|
| 6,721,358 B1 | 4/2004 | Pace et al. | |
| 6,946,958 B2 * | 9/2005 | Gundlach et al. | 340/539.21 |
| 7,098,770 B2 * | 8/2006 | Charrat et al. | 340/10.1 |
| 7,176,784 B2 * | 2/2007 | Gilbert et al. | 340/10.34 |
| 7,446,646 B2 * | 11/2008 | Huomo | 340/10.1 |
| 8,373,544 B2 | 2/2013 | Pitt-Pladdy | |
| 2003/0119453 A1 | 6/2003 | Blatz et al. | |
| 2003/0141989 A1 | 7/2003 | Arisawa et al. | |
| 2003/0164751 A1 | 9/2003 | Amtmann | |
| 2003/0169152 A1 | 9/2003 | Charrat et al. | |
| 2004/0176032 A1 | 9/2004 | Kotola et al. | |
| 2005/0156709 A1 * | 7/2005 | Gilbert et al. | 340/10.1 |
| 2005/0184150 A1 * | 8/2005 | Welte et al. | 235/385 |
| 2008/0018433 A1 | 1/2008 | Pitt-Pladdy | |
| 2013/0181818 A1 | 7/2013 | Pitt-Pladdy | |

FOREIGN PATENT DOCUMENTS

| | | |
|---|---|---|
| DE | 100 63 971 A1 | 7/2002 |
| DE | 695 26 626 T2 | 11/2002 |
| EP | 0 377 695 81 | 11/1994 |
| EP | 0 377 695 B1 | 11/1994 |
| EP | 0 899 682 A2 | 3/1999 |
| EP | 1038257 A1 | 9/2000 |
| EP | 1 280 099 A1 | 1/2003 |
| EP | 1 318 483 A2 | 6/2003 |
| EP | 1 457 914 A1 | 9/2004 |
| GB | 2 380 628 A | 4/2003 |
| WO | 0233644 A1 | 4/2002 |
| WO | 2005045744 A1 | 5/2005 |
| WO | 2005073906 A1 | 8/2005 |

OTHER PUBLICATIONS

Phillips, S2C Interface for NFC, Jan. 21, 2005, Phillips, Survey V1.0, slides 1-12.*

Heute, Radio-Frequency-IDendific@tion, Aug. 2001, Heute Technologies, pp. 1-3.*

Finkenzeller. K "RFID Handbook". $2^{nd}$ Ed. Wiley & Sons Ltd. Table of Contents, Apr. 2003.

Search Report of EPO regarding European Patent Application No. EP 10 01 1624, Jan. 7, 2011.

Search Report of EPO regarding European Patent Application No. EP 10 01 1623, Jan. 14, 2011.

Official Action of German Patent Office regarding German Patent Application No. 05 755 698.7-2210, Jun. 18, 2010.

Search Report of EPO regarding European Patent Application No. 10 01 1622, Jan. 7, 2011.

Charrat, Bruno: "Reader to Reader Technology", Jun. 30, 2004, XP002615806.

Search Report of German Patent Office relating to German Patent Application No. 10 2004 031 092.0, Jan. 4, 2005.

Finkenzeller. K "RFID Handbook", $2^{nd}$ Ed., Wiley & Sons Ltd. Table of Contents, Apr. 2003.

* cited by examiner

TRANSPONDER UNIT

FIELD OF THE INVENTION

The present invention relates to a transponder unit which is integrated for example as a transponder in chip cards, value documents or mobile telephones, to a method for data transfer between the transponder unit and a transponder reading device, and to a system comprising the unit and the reading device.

BACKGROUND

Transponders are used for example in radio frequency identification (RFID) systems. Conventionally, both the energy supply to a transponder in an RFID system and the data interchange between the transponder and a reading device are effected using magnetic or electromagnetic fields. RFID transponders have an electronic circuit and, depending on the frequency domain, an antenna coil (e.g. 13.56 MHz) or an electromagnetic antenna (e.g. 868 MHz). Via the antenna the energy required for operating the transponder can be taken from the field of the reading device, as well as the data transfer carried out.

Up to a certain distance between reading device and transponder, which is also referred to as the energy range, the transponder can take just enough energy for operating its circuit from the field of the reading device. Typical energy ranges of such systems are about 10 cm for ISO 14443 and up to 1 m for ISO 15693-compatible systems.

The range within which communication is possible in the system by data transfer can be increased by using active transponders, that is, transponders with their own energy supply. The energy supply of the active transponder, for example in form of a battery, operates its electronic circuit. Conventional transponders without their own energy supply are referred to as passive transponders, in contrast.

RFID systems, for example for different types of coupling, and a load modulation using a subcarrier in inductively coupled RFID systems are described in particular under chapter 3.2 in "RFID-Handbuch" by Klaus Finkenzeller.

For simple and fast contactless communication between two devices, the companies Philips and Sony have developed an inductive transmission technology which is known as so-called near field communication (NFC). This technology is integrated for example in mobile telephones or PDAs to permit communication between the devices or with a computer. The coupling of the two devices is effected via coils, the carrier frequency being 13.56 MHz as in RFID systems. As described more closely in the NFC standard ECMA 340, NFC systems have an active communication mode and a passive communication mode. In the active mode, two NFC units alternately generate their own RF field as a signal carrier, thus switching back and forth, coordinated with each other, between transmit mode and receive mode as in a classic mobile phone system. In the passive mode, however, the two NFC units must agree on which unit acts as a reading device and generates a field which the other unit can then influence by means of load modulation. Primarily due to the small antenna diameters used, NFC systems only permit small communication ranges of up to 20 cm.

Even with active transponders there is the problem that data transfer from the transponder to the reading device is limited by the signals becoming weaker with increasing distance between reading device and transponder. As a rule, ranges no longer than 1 to 2 m can therefore be obtained even with an active transponder for example in inductively coupled systems which transfer data to the reading device on the principle of load modulation. For RFID systems working on the principle of backscatter, however, communication ranges of 10 m are typically obtained.

SUMMARY

It is therefore the problem of the invention to extend the range of data transfer in a system comprising a transponder reading device and a transponder unit compared to conventional systems with active or passive transponders.

This problem is solved by the features of the independent claims. Advantageous embodiments and developments of the invention are stated in dependent claims.

According to the invention, a transponder unit sends a signal to a transponder reading device, which can communicate with the transponders by means of modulation of its own field by transponders, in such a way that the reading device can evaluate the signal as modulation by a conventional transponder. Instead of performing a load modulation or backscatter modulation of a field of the reading device, the transponder unit itself thus emits a field that simulates for the reading device a modulation of the reading device field by a transponder. An inventive transponder unit has means for sending the accordingly modulated signal. The total range of the system is consequently no longer limited by the communication range of the reading device, but is extended therebeyond up to a transmit range of the transponder unit.

In an advantageous embodiment, an inventive RFID transponder unit has its own energy supply, at least one antenna for transmitting signals from and/or to a reading device, and an electronic circuit. The electronic circuit of the inventive transponder unit comprises a transmitter consisting of an oscillator and a modulator.

In a first alternative, the modulator comprises a ring modulator. The oscillator is coupled with the battery and provided to deliver an oscillator signal to the ring modulator. Furthermore, the ring modulator is supplied via a second input the data signal which either is generated in a controller of the transponder unit or which the transponder unit feeds in externally. Before being supplied to the ring modulator, the data signal can be modulated with a subcarrier. It is characteristic of the ring modulator that it performs a DSB modulation (double side-band modulation) and is usable independently of the form of the data signal (analog or digital).

The ring modulator can be formed as an analog or digital ring modulator. In an embodiment as a digital ring modulator, a logic XORing of a carrier frequency signal with a modulated subcarrier signal is preferably carried out. It is particularly advantageous if the digital ring modulator is supplied a carrier frequency signal ANDed with the data signal.

In a second alternative, the modulator performs a logical ANDing of a carrier frequency signal with a modulated subcarrier signal. This modulator for logically combining two signals is preferably used only when the data signal is a binary signal (2-ASK, BPSK). In this case, the ring modulator can be omitted in the transponder unit. An analog ring modulator must only be used in case of a multilevel modulation (e.g. 4-ASK, 16-ASK, 4-PSK, 16-ASK, etc.) or analog signals, to increase the range of data transfer compared with conventional systems. An advantage of a modulator for logical ANDing of two signals is that it is simpler to realize in comparison with an analog ring modulator.

Both modulators (ring modulator and ASK modulator) modulate the oscillator signal by means of the (modulated)

data signal and deliver an output signal which is then transmitted to the reading device via the receive antenna or a separate transmitting antenna.

In a preferred embodiment, the modulator comprises a carrier frequency modulator, for example in the form of the ring modulator or ASK modulator, and a subcarrier modulator.

A special advantage of using the described modulators is their compatibility to the prior art, since they deliver an output signal to be sent to the reading device whose (frequency and amplitude) spectrum is very similar to that of a load or backscatter modulation, as described above. Therefore, no technical changes must be performed on conventional reading devices. The inventive transponder can thus be operated with commercially available RFID reading devices, the communication range being many times that of passive or even active transponders. For example, a commercially available ISO 14443 reading device which can communicate with an inductively coupled, contactless chip card according to the prior art over a distance of approx. 10 cm could communicate with an inventive transponder unit over many times this distance.

A further advantage is the compatibility with other passive and active transponders, so that both can be located within the response range of the reading device at the same time and can be addressed without mutual interference.

The inventive transponder unit sends the data only in side bands spaced at the frequency of the (modulated) data signal to the transmitting frequency of the reading device.

The electronic circuit of the transponder unit further comprises in the usual way a receiver which is so designed that it can detect signals from a reading device. From said signals the receiver extracts data by means of a demodulation circuit, so that a data stream transferred from the reading device is available at the output of the receiver as a baseband signal (e.g. as an NRZ code, Miller code, etc.). For example, the data can be a simple instruction to activate the controller. However, the data may also contain a more complex instruction to the controller. The demodulated data are supplied to the controller in the electronic circuit. A data signal is thereupon generated in the controller, whereby the data signal can also be based on the extracted data.

In a development, the inventive transponder unit has a load modulator according to the prior art, in addition to the above-described circuit having a receiver, a controller, an oscillator and a modulator.

The voltage induced on the antenna of the transponder unit can be a problem for the operation of the inventive modulator circuits if the distance between trans-ponder unit and reading device is small and the induced voltage is therefore accordingly great. Therefore, the data to be sent to the reading device which are generated in the controller are supplied alternatively to the load modulator or to the inventive circuit configuration with a modulator. The switchover between the load modulator and the circuit configuration is preferably effected automatically, in dependence on the level of voltage induced on the antenna. The switchover is effected in such a way that the load modulator is used within the normal communication range, and the inventive modulator outside the normal communication range.

If a subcarrier signal is used in the data transfer from the transponder unit to the reading device, as mentioned above, a circuit configuration for generating and modulating said subcarrier signal is provided in an embodiment of the present invention. In a first alternative, the circuit configuration is part of the inventive transponder unit. Another alternative in which the circuit configuration is not part of the trans-ponder unit will be dealt with in detail below. The frequency of the subcarrier signal is preferably generated by dividing the oscillator frequency. The amplitude of the subcarrier signal is switched over between two states in the circuit configuration by the data to be sent which are present for example as a binary code signal. This process is called amplitude shift keying (ASK) or ASK modulation. ASK modulation comes about, mathematically speaking, from multiplying the binary code signal by the subcarrier signal. The modulated subcarrier signal is then supplied either to the ring modulator or to the modulator for logically combining two signals. A phase modulation is also possible, for example a BPSK modulation of the subcarrier signal.

Furthermore, the transponder unit of the present invention can have a voltage limiter which is provided for limiting the voltage induced on the antenna by the reading device. This makes it possible, among other things, to avoid the above-described problem of overload when the transponder unit and the reading device are disposed a small distance apart. The voltage limiter used can be for example a shunt regulator.

In particular for communication according to the standard ISO 14443 type A, exact timing is important. With conventional passive transponders, timing is ensured even in the transmit mode (load modulation) by the timing signal (13.56 MHz) continually received from the reading device. However, such a signal is no longer available in the transmit mode of an inventive circuit configuration. In one embodiment of the invention, an oscillator is therefore provided for example in the form of a quartz oscillator.

To avoid a quartz oscillator, which has a large mounting form, an improved embodiment of the invention has the oscillator coupled in phase lock to the signal received from the reading device via a phase locked loop (PLL) circuit when the trans-ponder unit is in the receive mode. In the transmit mode of the transponder unit, that is, during data transfer from the transponder unit to the reading device, the control voltage of the PLL circuit is kept constant so that the frequency of the oscillator is maintained as stable as possible. The PLL can also be referred to as tracking synchronization. The oscillator is so regulated that it follows in phase a reference signal, in the present case the timing signal of the reading device. The regulation circuit continuously compares the phase relationship of the two signals and adjusts that of the oscillator in case of an error signal. A PLL circuit is used primarily for frequency stabilization or synchronization of the oscillator. Additionally, it is possible to also supply the signal generated by the oscillator to the controller and use it as a timing signal relevant for timing.

The possibility of reading the inventive transponder unit over very large distances is not always desired, for example for privacy protection. It is therefore provided in one embodiment that the inventive circuit configuration can be activated manually if communication over a long range is explicitly desired. Otherwise, communication can be effected via a load modulator provided in the transponder unit, which is usable only for short distances. If no load modulator is provided in the trans-ponder unit, it can be provided for example that the transponder unit is activated for sending data only if the signal emitted by the reading device contains a predetermined code.

The transponder unit can also be part of a mobile terminal, for example a mobile telephone. The transponder unit can have its own antenna or use an antenna of the terminal.

According to a first alternative, the circuit configuration for generating and modulating the subcarrier signal is a separate part of the mobile terminal. The trans-ponder unit then has a signal input for receiving the subcarrier signal modulated by means of the data to be sent from the circuit configuration. The signal input is connected via a suitable interface in particular to a chip, for example a smart card chip, which generates and modulates the subcarrier signal.

According to a second alternative, the circuit configuration for generating and modulating the subcarrier signal is part of the inventive transponder unit itself. To then connect the transponder unit to a (smart card) chip of the terminal, which supplies data to be sent for example, an interface can be provided via which data are transferred in binary form.

The advantage of this alternative is that the smart card chip itself need not make any HF (or RFID) interface available, since all necessary functions for transferring data are performed by the transponder unit.

The transponder unit is preferably integrated in a card or data carrier insertable into the mobile terminal. For example, the transponder unit can be integrated in a SIM card. The advantage is that the mobile terminal, for example a mobile phone or PDA, into which the card with the inventive transponder unit is inserted requires no additional (integrated) antenna to be usable as an RFID unit.

BRIEF DESCRIPTION OF THE DRAWINGS

Further features and advantages of the invention will emerge from the following description of inventive embodiments in conjunction with the accompanying drawings. The figures are described as follows.

DETAILED DESCRIPTION OF VARIOUS EMBODIMENTS

Figure 1:
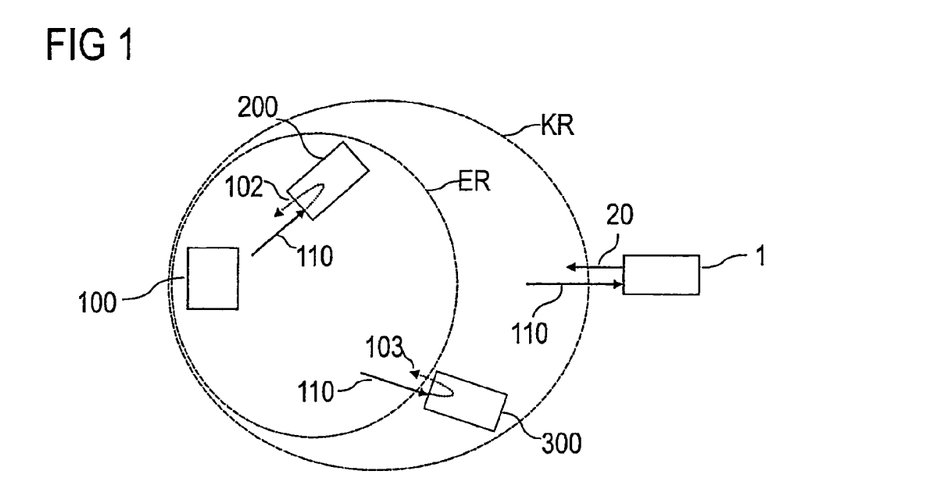
FIG. 1 a system comprising a transponder unit and a reading device.

FIG. 1 shows a system for data transfer comprising a transponder unit 1 and a reading device 100 cooperating with the transponder unit 1.

The conventional reading device 100 can exchange data with conventional passive transponders 200 within the energy range ER and with conventional active transponders 300 within the communication range KR.

Depending on a type of system used, data can be transferred from the trans-ponders 200, 300 to the reading device 100 either by means of load modulation (inductive coupling) or by means of modulated backscatter cross section (electromagnetic backscatter coupling). Embodiments will preferably be described hereinafter for systems that transfer data to the reading device on the principle of load modulation. However, the individual aspects of the embodiments are largely also applicable analogously to systems that work on the principle of modulated backscatter cross sections of the transponder unit.

The transponder unit 1 sends for data transfer to the reading device 100 a signal which the reading device 100 can evaluate as a signal of a transponder which carries out a load modulation of the field 110 of the reading device 100. Unlike the conventional transponders 200, 300 which modulate the field 110 of the reading device 100 into a modulated reading device field 102, 103, the transponder unit 1 thus generates and sends its own modulated field 20 as the signal for data transfer. The transponder unit 1 thus uses its own energy for the purpose of data transfer.

To obtain a better signal-to-noise ratio, in an inductive system with a carrier frequency $f_T$ of the RFID reading device of for example 13.56 MHz a subcarrier $f_H$ with $f_H<f_T$, for example $f_H=212$ kHz, is used in the known way. The load resistance in the transponder unit is switched on and off at the frequency $f_H$, so that two subcarrier signals spaced $+/-f_H$ arise in the signal spectrum besides the strong signal of the carrier frequency $f_T$ of the reading device. When the subcarrier is now modulated in the transponder unit 1 according to the data to be transferred, the modulation side bands carrying the information arise in the spectrum below and above the two subcarriers. The data to be transferred are thus contained equally in the side bands of the sub-carriers which are disposed on both sides of the two corresponding spectral lines in each case. Data transfer is effected here by ASK, FSK or PSK modulation of the sub-carrier in time with the data flow. In contrast to load modulation without a subcarrier, by which data are transferred in side bands around the carrier frequency of the reading device, the subcarrier signal can be filtered out and demodulated better in the reading device to thereby retrieve the data.

The transponder unit 1 accordingly generates and sends its own field 20 which comprises at least the modulation side bands around the carrier frequency $f_T$ or the modulation side bands around a subcarrier frequency $f_H$, but as a rule the modulation side bands of both subcarriers together with the two subcarriers.

Such a system can be versatilely used, and in many application cases avoids the necessity of a further interface in the reading device.

For example, in a building where the system is installed as an access system, each access-authorized person can authenticate himself contactlessly by means of a transponder unit 1 in the form of a chip card. Doors equipped with RFID reading devices of the access system in the building, including access gates, can be opened by the chip card so early that there is no waiting time for the door to open automatically.

A further example is use in department stores, storage systems or transport systems, in which articles, storage containers or transport containers are equipped with an inventive transponder unit in the particular case. It is thus possible to register the article or containers in particular automatically without any great range restrictions.

Further, a mobile terminal comprising an inventive transponder unit could be used as a maintenance or monitoring unit for checking for operability, or remotely maintaining, a multiplicity of RFID reading devices, for example at the cash registers of a supermarket or an access system.

Figure 2:
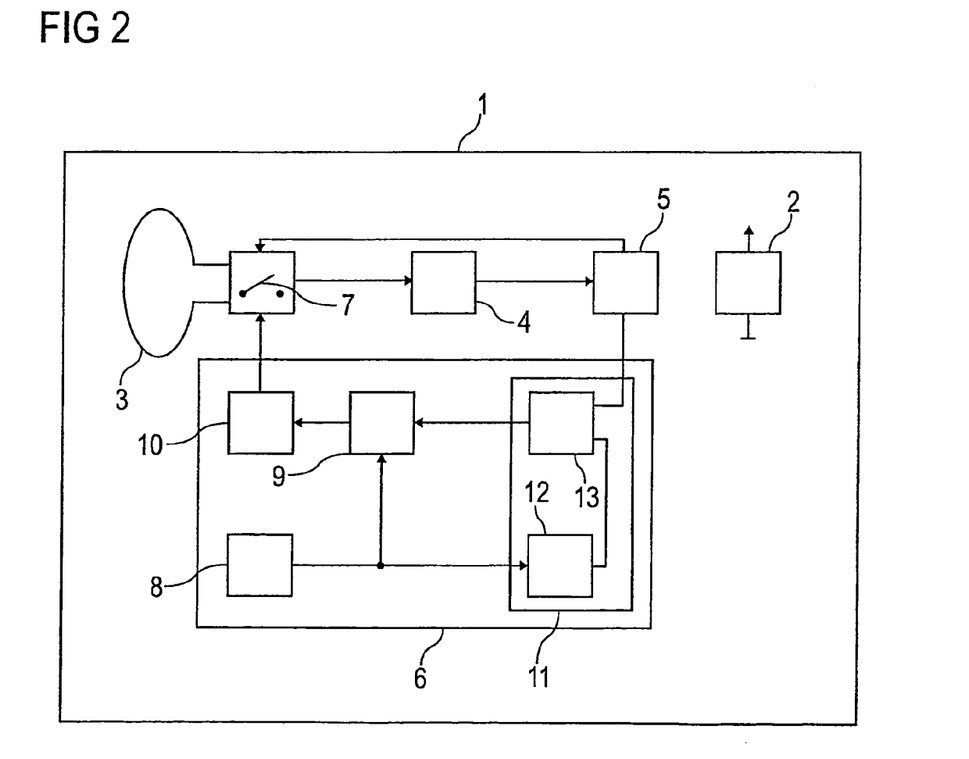
FIG. 2 a transponder unit schematically with an inventive circuit.

FIG. 2 shows purely schematically the transponder unit 1, for example in the form of an inductively coupled chip card, which comprises the usual components not shown explicitly here. For simplification, only one inventive RFID transponder unit in a chip card is shown. The transponder unit has a battery 2, an inductive antenna 3 and an electronic circuit 4, 5, 6, 7. The electronic circuit consists substantially of three functional blocks, a receiver 4, a controller 5 and a transmitter 6. A switch 7 is used for switching the antenna 3 between the receiver 4 and the transmitter 6.

The receiver 4 is provided for demodulating a signal transmitted from the reading device 100 to extract data therefrom. The extracted data are passed on to the controller 5 which processes them and generates data to be sent to the reading device 100. Furthermore, the controller 5 transmits a control signal to the switch 7 which switches between receive mode and transmit mode of the transponder unit. However, a separate antenna can instead be provided for sending. The controller 5 used can be for example a part of the operating system of a portable data carrier, such as a chip card.

The transmitter 6 consists of an oscillator 8, a modulator, an execution as a ring modulator 9 first being described, and a terminal repeater 10. Furthermore, the transmitter 6 of the transponder unit shown in FIG. 2 is extended by an electronic assembly 11 for generating and modulating a subcarrier signal to carry out the data transfer from the transponder unit to a reading device 100 with a subcarrier signal. Depending on the use of the transponder unit, the subcarrier signal can have different frequencies, for example 848 kHz according to ISO 14443, 424 kHz according to ISO 15693 and 212 kHz for LEGIC, but might also be completely omitted.

In the transponder unit shown in FIG. 2 it is provided that the assembly 11 divides the oscillator frequency by a certain factor by means of a frequency divider 12, for example by binary division. The resulting subcarrier signal is modulated with the data to be sent which are supplied to the assembly 11 by the controller 5.

Modulation of the subcarrier in the assembly 11 is effected for example in an AND gate 13 by so-called 100% amplitude shift keying (ASK). In the process, the amplitude of the signal generated by frequency division is switched between two states "on" and "off" with reference to the data to be sent. Alternatively, a (B)PSK modulation, for example according to ISO 14443 type B, or an FSK modulation can be effected.

To supply the active components of the transponder unit at least partly with energy and to increase the energy range between the transponder unit 1 and the reading device 100, the inventive transponder unit has a battery 2.

Both the oscillator signal and the ASK-modulated signal generated in the assembly 11 are supplied to the ring modulator 9, whose circuit arrangement will be described more closely below with reference to FIG. 3.

The ring modulator 9 has the feature of carrying out a special form of amplitude modulation. As in usual amplitude modulation, two spectral lines, regarded in the frequency spectrum, are generated spaced at the frequency of the ASK-modulated signal around the frequency of the oscillator signal, the so-called carrier frequency. With amplitude modulation in the ring modulator 9, the carrier frequency of the strong and high-energy oscillator signal is largely suppressed. The data to be sent contained in the ASK-modulated signal are located after the amplitude modulation in the ring modulator 9 in side bands around the two spectral lines of the subcarrier frequency. Such modulation is called double side band (DSB) modulation or double side band suppressed carrier (DSSC) modulation. At the carrier frequency no data are transferred. Instead, the use of the ring modulator 9 which suppresses the carrier frequency achieves the goal of being able to send data to the reading device 100 either at lower transmit power or with a considerably increased range. The increased range is possible primarily when the total transmit power is put into the side bands where the data to be sent are located. The carrier frequency is fundamentally required for demodulation of the signal, for extracting the data transmitted from the transponder unit in the reading device. However, since the carrier frequency is already present in the reading device, it is unnecessary for the transponder signal to contain this frequency itself.

At the output of the ring modulator 9 an output signal is then available that contains the two modulation side bands and is identical (exactly enough) to a signal generated by load modulation or backscatter modulation. The output signal generated by the ring modulator 9 can then be optionally amplified by means of the amplifier 10, and be supplied to the antenna 3 for sending the data to be sent, via the switch 7 which is switched to the transmit mode of the transponder unit by a signal of the controller 5.

The direct connection of the ring modulator output to the antenna is likewise possible. However, it is then necessary to adapt the antenna accordingly, and take account of a possible reaction of the signal coupled in from the reading device on the ring modulator, since the same antenna is normally used for sending and receiving, and since the reading device sends continually.

The transponder unit 1 is operated in a first (active) operating mode as an actively sending transponder. In a second (passive) operating mode, however, the trans-ponder unit works like an ordinary passive transponder performing a load modulation on the field of the reading device.

For example, the receiver 4 can additionally be formed as a conventional load modulator driven by the controller 5. The controller 5 then either switches the transmitter 6 on and the load modulator off, or the load modulator on and the transmitter 6 off. The switch 7 is switched accordingly. The criterion used for switching from a passive to an active operating state can be for example the received signal strength, the presence and/or sufficiency of an external voltage supply (on an optional connection Vcc not shown), or the sufficiency of an internal voltage supply (state of charge of the battery 2). It is thus for example possible to first operate a transponder unit 1 passively and switch it to an active operating mode if for example the distance from the reading device unintentionally increases.

The type of application for which the data are transferred can also be a criterion for the operating mode. Thus, the transponder unit should only work in the passive mode for security-critical applications. In contrast, a less critical application such as a check of access authorization for rooms or buildings will preferably work in the active mode. A default value for the generally or currently preferred operating mode should be selectable for the owner of the transponder unit for example via a terminal in which the transponder unit is inserted or integrated. Switching between the active and passive modes is preferably done during reception of data by the transponder unit, that is, in the active or passive receive mode.

Figure 3:
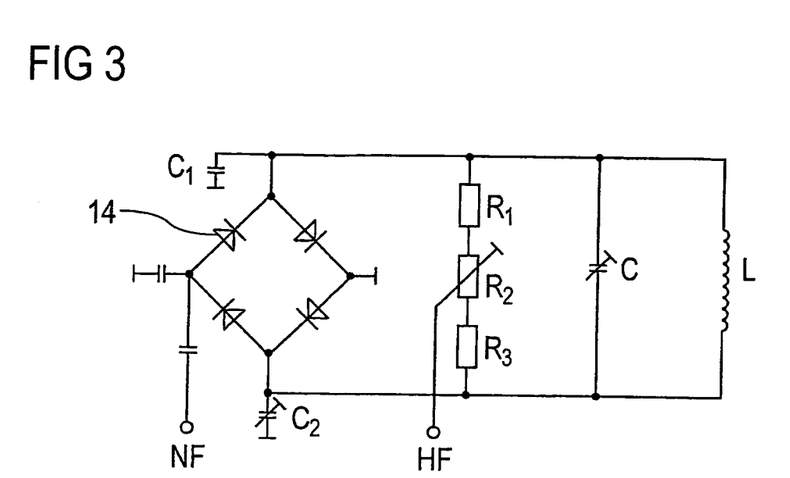
FIG. 3 a schematic circuit diagram of an analog ring modulator.

FIG. 3 shows a schematic circuit diagram of a ring modulator 9. As described above, the essential point of using the ring modulator 9 is that it performs an amplitude modulation whereby the modulation side bands of a subcarrier are generated in the usual way but the carrier frequency is very largely suppressed. For example, the inventive transponder unit can use an MC 1496 balanced modulator from the company ON Semiconductor, which is particularly suitable for carrier suppression. The ring modulator can be completely integrated on a transponder chip, so that an inventive transponder chip only needs connections for the antenna 3 and the voltage supply with complete integration of all components.

The input HF of the ring modulator 9 is fed with the high-frequency output signal of the oscillator 8. The frequency of the oscillator signal preferably corresponds exactly to the transmitting frequency of the reading device 100 (e.g. 13.56 MHz). The input NF of the ring modulator 9 is fed with a data signal in the baseband (e.g. for Felica system) or with a modulated subcarrier (e.g. for ISO 14443, ISO 15693), as described above.

Four diodes 14 are switched together into a ring in the ring modulator 9 by an anode being joined in each case to a cathode of the following diode 14. One corner of the diode bridge is grounded, and the signal at the input NF is coupled in capacitively at the opposite corner. To obtain good carrier suppression, the oscillator signal is coupled in through the input HF via an adjustable resistance bridge.

The data signal in the baseband, or modulated subcarrier signal, fed into the ring modulator 9 at the input NF is switched between the proper and inverted forms in the oscillation rhythm of the oscillator signal, thereby canceling the carrier frequency by the thus opposed symmetrical voltages. A circuit shown in FIG. 3 is also referred to as a balance modulator.

Figure 4:
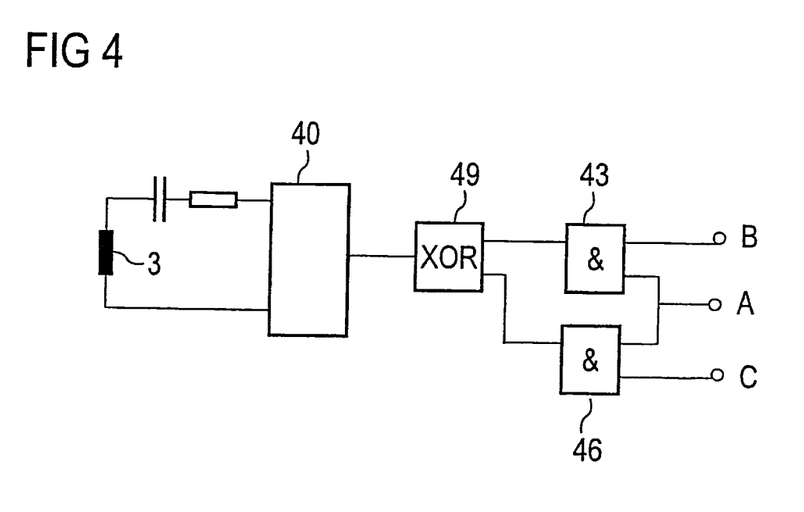
FIG. 4 an embodiment of a transmitter for a transponder unit with a digital ring modulator, FIG. 5 a transmitter for a transponder unit with an ASK modulator as a carrier frequency modulator, FIG. 6 a transmitter for a transponder unit with an ASK modulator as a carrier frequency modulator and a modified subcarrier modulator, FIG. 7 a transponder unit in which a security module is connected to an interface module via an S²C interface, FIG. 8 an interface module for a transponder unit according to FIG. 7, FIG. 9 a transponder unit in which a chip with a conventional HF interface is connected to an interface module in a further embodiment, FIG. 10 a transponder unit in which a chip with a conventional HF interface is connected to a modified interface module, and FIG. 11 a detail of a transponder unit in which a chip with a conventional HF interface is coupled inductively to an interface module.

FIG. 4 shows schematically an alternative structure of the transmitter of a transponder unit with a digital ring modulator.

Just as in the structure according to FIG. 2, the binary data signal A is combined with a subcarrier signal B by an AND gate 43. The combined signal is available at a ring modulator 49. The digital ring modulator 49 used can be an XOR element. Departing from the structure of the transmitter in FIG. 2, a carrier signal C is not applied directly to the input of the ring modulator 49. Instead, the carrier signal C is first combined with a data signal A in an AND gate 46. This arrangement obtains better efficiency, as to be described more closely below. The output signal of the ring modulator 49 is amplified in an amplifier 40 before being emitted via the antenna 3 as the field of the transponder unit. The signal types A to C will hereinafter be described more closely by way of example with reference to FIG. 5.

Figure 5:
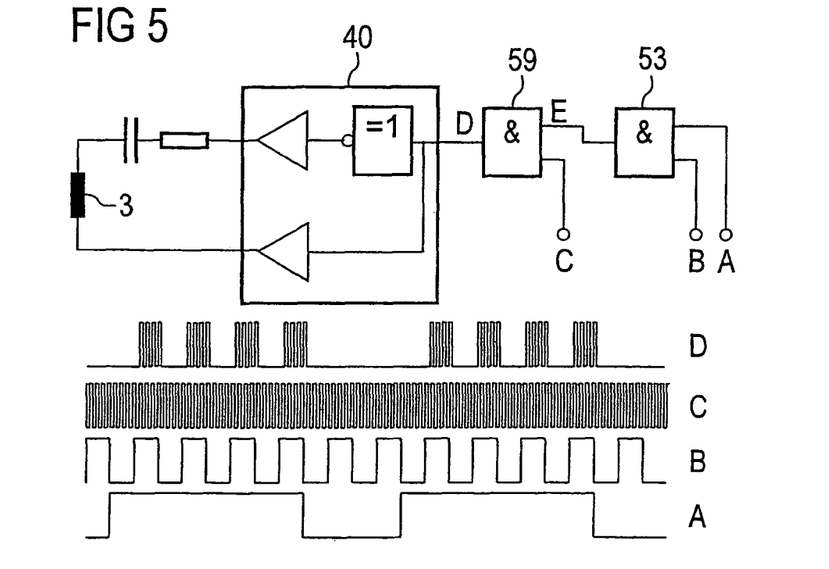

FIG. 5 shows schematically an alternative transmitter of a transponder unit without a ring modulator.

The transmitter serves to generate an amplitude-modulated signal, the shown transmitter preferably being used for binary data signals A, thereby resulting in an OOK signal (on-off keying) or a 2-ASK signal. The data signal A in the baseband (e.g. an NRZ or Manchester signal), a subcarrier signal B (e.g. 848 kHz for ISO/IEC 14443) and a carrier signal C (e.g. 13.56 MHz for ISO/IEC 14443) are ANDed by means of suitable logic circuits 53, 59, whereby first the signals A and B are ANDed by means of the circuit 53, resulting in the signal E. The signal E is then ANDed with the signal C by means of the circuit 59, resulting in the signal D. Functionally, the circuit 59 performs the function of the modulator here, and the circuit 53 the role of the AND gate 13 from FIG. 2.

The signal D emitted by an antenna 3 to a reading device has a frequency spectrum that is like a frequency spectrum resulting by means of load modulation. The signal D can optionally be amplified by means of an amplifier 40. The amplifier 40 can be for example a push-pull amplifier with digital push-pull output amplifiers.

Figure 6:
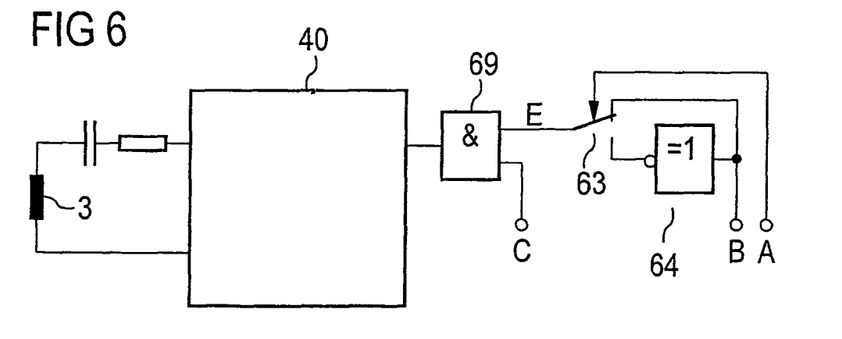

FIG. 6 shows schematically a slight variation of the transmitter of FIG. 5.

In the transmitter according to FIG. 5 an amplitude-modulated subcarrier signal is generated, while the transmitter shown in FIG. 6 generates a phase-modulated subcarrier signal. This transmitter, like the transmitter of FIG. 5, is preferably used in an inventive transponder unit only when the data signal A is a binary signal. Correspondingly, the transmitter shown generates a BPSK signal (2-PSK, binary phase shift keying). A subcarrier signal B (e.g. 848 kHz for ISO/IEC 14443) and a carrier signal C (e.g. 13.56 MHz for ISO/IEC 14443) are thereby ANDed by means of the circuit 69. The data signal A in the baseband (e.g. NRZ or Manchester signal) switches the subcarrier signal B between an inverted and a non-inverted state with the help of a switch 63 and an inverter 64. This has an effect corresponding to a phase modulation by 180° (BPSK, binary phase keying).

A signal D which results by simple ANDing of the phase-modulated subcarrier signal E with the carrier signal C and is emitted by means of the antenna 3 advantageously has a frequency spectrum that is like that of a load modulation with a BPSK-modulated subcarrier.

The following table shows a survey of logic operation on signals, electricity consumption and range for different digital modulation circuits (carrier frequency TF=13.56 MHz; subcarrier frequency HT=868 kHz and modulation signal MS in the baseband, Manchester 106 kbit/s).

| Modulation circuit | Logic operation | Electricity consumption | Range |
|---|---|---|---|
| ISO/IEC 14443 A | | | |
| Digital ring modulator XOR | (HT ∩ (MS) XOR TF | 100% | 100% |
| Optimized ring modulator | (HT ∩ MS) XOR (TF ∩ MS) | 50% | 100% |
| ASK modulator | TF ∩ (HT ∩ MS) | 25% | 83% |
| ISO/IEC 14443 B and HIB | | | |
| Digital ring modulator XOR | ((HT ∩ MS) ∪ (HT\ ∩ MS\)) XOR TF | 100% | 100% |
| ASK modulator | ((HT ∩ MS) ∪ (HT\ ∩ MS\)) ∩ TF | 50% | 83% |

Upon data transfer from a transponder to the reading device an ASK-modulated subcarrier (OOK, on-off keying: HT∩MS) is used according to ISO/IEC 14443-3/type A at the initialization bit rate of 106 kbit/s. When this signal is simulated actively according to the inventive method, the required side bands can be generated most effectively with a ring modulator. The resulting double side band modulation (DSB) should show the best results with regard to communication range, since the carrier frequency (13.56 MHz) is suppressed and the available energy is provided in the side bands.

If an XOR element were simply used as a digital ring modulator in the circuit configuration according to FIG. 2, poor carrier suppression would be obtained in the examined signal according to ISO/IEC 14443 type A. This is primarily due to the fact that the carrier signal is also emitted in the modulation pauses, i.e. 100% of the time, and leads to unnecessarily high current consumption.

When using an ASK-modulated subcarrier (OOK, e.g. 14443/type A) it is in any case expedient to combine the carrier frequency signal TF provided to be fed into the digital ring modulator with the baseband signal MS by means of logic ANDing (TF∩MS) and to feed the resulting signal into one input of the digital ring modulator. This results in a reduction of the current consumption to 50% compared with the simple ring modulator. The HF signal is then emitted only at the times when the subcarrier is also on. The communication range of this circuit corresponds exactly to the range of the simple digital ring modulator. The carrier frequency is now clearly suppressed in the output spectrum, as is to be expected from a ring modulator. Such a circuit configuration was described above with reference to FIG. 4.

The ASK modulator is realized by ANDing all input signals, as shown in FIG. 4. The output signal now only consists of carrier frequency bursts in time with the subcarrier frequency and the modulation signal in the baseband. With regard to range, losses must be accepted, the range dropping to 83% compared with the ring modulator. However, current consumption is only 25% compared with the simple ring modulator. This modulation circuit thus seems especially advantageous, since the energy consumption of the circuit can be reduced to 25% with a small compromise in range.

For an external HF interface—for example with the S2C interface described more closely below—an ASK modulator should preferably be used, since the power consumption is the lowest here. If the HF interface is integrated into a smart card chip, or an HF interface providing the signal (TF∩MS) is used, the optimized ring modulator will preferably be used in case of sufficient energy. If energy is to be saved, however, the ASK modulator can be used here too.

In data transfer from a transponder to the reading device according to ISO/IEC 14443-3/type B, and at baud rates of 212 kbit/s and more, for both interface types A and B, a BPSK-modulated subcarrier (binary phase shift keying) is used.

In the active simulation of such a signal, a ring modulator provides the best results with regard to communication range here too. The digital ring modulator shows good behavior with regard to carrier suppression. However, the relative current consumption is 100%, since HF energy is radiated for the total duration of a bit.

The ASK modulator shows poor behavior with regard to carrier suppression. Current consumption drops to 50% compared to the digital ring modulator.

For BPSK- or also FSK-modulated subcarriers, an ASK modulator is preferably to be used since the transmitter requires the lowest current consumption here. If sufficient energy is available, however, the simple digital ring modulator can also be used. An optimized digital ring modulator is not possible, since in PSK or FSK modulation of the subcarrier the latter must be sent for the total duration of a bit.

Hereinafter, some advantageous ways of realizing an inventive circuit in connection with known components will be discussed with reference to FIGS. 7 to 11.

There are smart card chips having a so-called $S^2C$ interface, defined by the company Philips, for connecting the smart card chip to an HF interface of an NFC device. Such smart card chips have hardware means for generating and decoding signals required on an ISO/IEC 14443 interface (Miller code, Manchester code, subcarrier 848 kHz). However, such a chip does not have an HF interface unit of its own.

Figure 7:
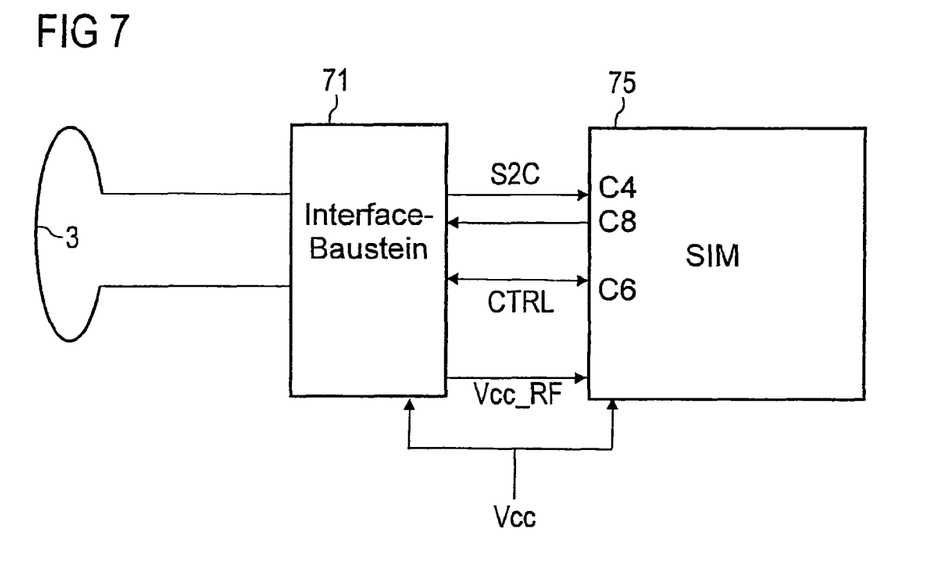

FIG. 7 shows schematically an inventive transponder unit, formed by an interface module 71 connected to an antenna 3, and a chip 75 with a suitable interface, for example an $S^2C$ interface. Such a transponder unit can be formed for example in a mobile telephone with the help of the SIM card as chip 75, which is then preferably connected to the interface module 71 via one or more idle contact surfaces (C6 and/or C4, C8) of the SIM card.

Both the interface module 71 and the chip 75 can draw their supply voltage from the device in which they are disposed preferably reversibly. The interface module 71 can act as an ordinary transponder in a second operating mode and supply the chip with an operating voltage Vcc_RF.

Figure 8:
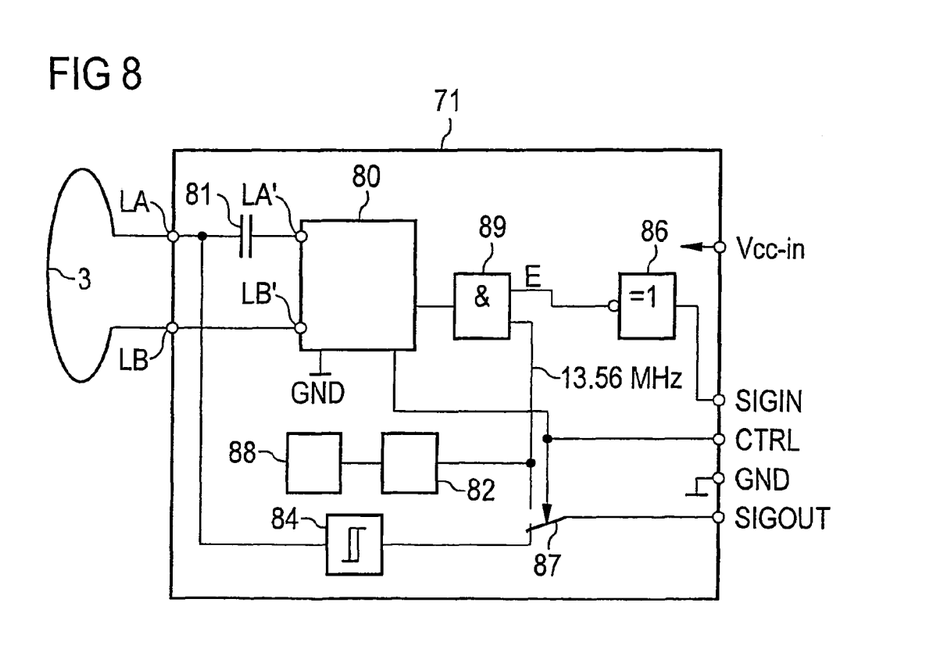

FIG. 8 shows schematically more exactly the structure of an interface module for a chip with an $S^2C$ interface.

The interface module 71 is equipped with a signal input SIGIN and a signal output SIGOUT for passing signals from the antenna to the chip (not shown) and from the chip, which generates the modulated subcarrier signal, to the antenna. A signal at SIGOUT consists of a 13.56 MHz TTL signal which optionally contains a modulation signal of a remote reading device.

The interface module 71 comprises an amplifier 80, an AND gate 89, an oscillator 88, a frequency divider 82, a signal shaper 84 and a switch 87. The amplifier 80 can be for example a push-pull amplifier with (digital) push-pull output amplifiers (not shown). The interface module also has two antenna connections LA and LB and a series capacitor 81. Furthermore, the interface module 71 has connections Vcc-in and GND for energy supply and a control input CTRL for switching between a transmit mode and a receive mode of the interface module by means of the switch 87.

The externally modulated subcarrier signal is passed via a suitable interface (e.g. S2C interface from Philips) to the signal input SIGIN of the interface module 71 and processed further there, as described hereinafter. The subcarrier signal is for example an 848 kHz TTL signal which is ASK-modulated (ISO/IEC 14443 A, Manchester code) or BPSK-modulated (ISO/IEC 14443 B, NRC code).

When the interface module is in the transmit mode, i.e. there is a contactless data transfer to an external reading device or an NFC device, a modulated subcarrier signal is fed in at the signal input SIGIN by the smart card chip and optionally inverted in an inverter 86. The inverted signal E is combined with a 13.56 MHz carrier frequency signal in the AND gate 89 as the carrier frequency modulator, and supplied to the amplifier 80.

The antenna 3 and the series capacitor 81 form a series-resonant circuit which is connected to the outputs LA' and LB' of the amplifier 80, so that the HF current flowing in case of resonance is limited in the antenna resonant circuit only by the ohmic resistances in the lines and in the amplifier 80. This obtains a greatest possible transmit power of the interface module.

Further, the smart card chip can be supplied a constant 13.56 MHz timing signal from the oscillator 88 via the output SIGOUT in the transmit mode via the switch 87, if it requires such an (external) timing signal for operation to keep exact timing. As described above, this is necessary for communication according to the standard ISO 14443 type A.

In the receive mode, the smart card chip is supplied a digitized received signal tapped from the antenna 1, via the switch 87 and the output SIGOUT. The signal shaper 84 acts here as an amplifier to be able to receive even weak signals, and as a threshold switch to provide a digital output signal at the output of the signal shaper. For example, the threshold switch used can be a Schmitt trigger which outputs a clear high or low level depending on the over- or undershooting of a predetermined threshold value.

Via the control input of the push-pull amplifier 80 the push-pull outputs of the output drivers (see amplifier units in FIG. 5) are switched to GND, so that the antenna 3 and the capacitor 41 result in a parallel-resonant circuit. To save energy, the amplifier 80 can be switched to a power save mode in the receive mode of the interface module.

The oscillator 88 generates the 13.56 MHz carrier frequency signal required in the transmit mode. If the oscillator cannot be switched off in the receive mode since its building-up transient might last too long, the oscillator is operated in the receive mode of the interface module preferably at a multiple N of the carrier frequency signal (e.g. 27.120 MHz) so as not to disturb the possibly weak received signal by crosstalk. In the transmit mode the required 13.56 MHz signal can then be generated by dividing the oscillator signal by N by means of an optional divider 82.

The control signal input CTRL for a control signal is optional, since the control signal for switching over the operating mode can also be derived from the input signal at the signal input SIGIN. For example, a monostable timing element (mono-flop) can generate a control signal from the input signal at SIGIN. There is an active input signal only when the chip wants to send data. When the monostable timing element is now triggered with the first edge of the input signal a control signal is obtained as the output of the timing element. In particular, the timing element should be realized so as to be post-triggerable and be adjusted so as to fall back to the initial state approximately after a time of 1 to 2 times the bit time (i.e. at most the FGT, frame guard time). The control signal thus activates a receive mode again when no more data are sent.

Figure 9:
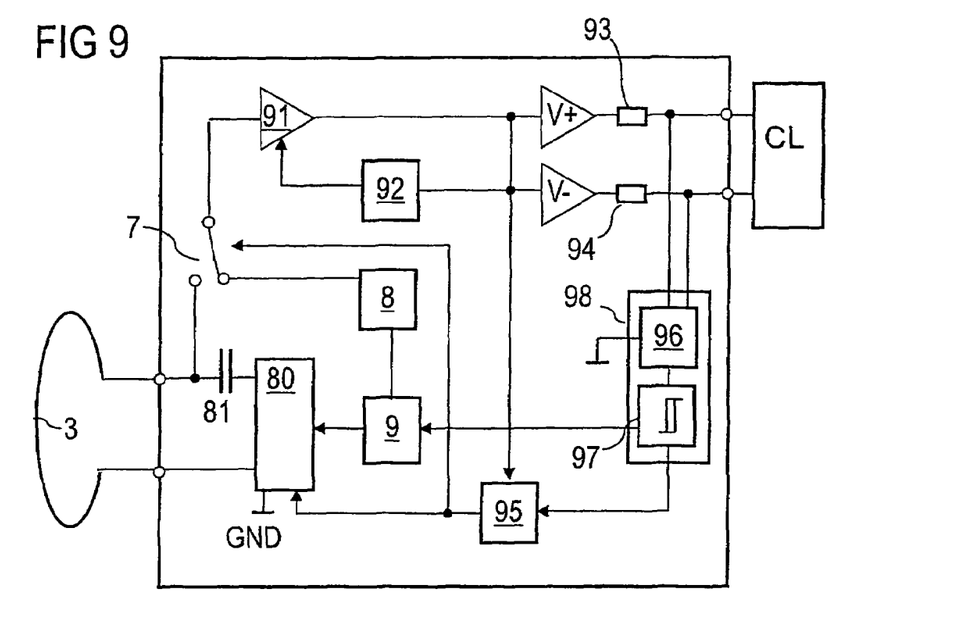

FIG. 9 shows schematically the structure of an interface module for connection to a chip with a conventional HF interface.

The inventive active transponder unit has a receive branch and a transmit branch. The receive branch consists of an antenna 3, an input amplifier 91, an automatic gain control 92 and an amplifier which is preferably designed as a push-pull amplifier (V+, V−). Further, a transponder chip CL is connected via its antenna connections to the push-pull amplifier.

The transponder chip CL is a conventional RFID chip according to the prior art. It is normally connected at its connections with an antenna, e.g. in a chip card. Further, the transponder chip CL is so designed that data transfer from the transponder unit to a reading device is carried out by means of load modulation. This is almost always the case in usual RFID systems used at 13.56 MHz or also 125 kHz (e.g. ISO/IEC 14443, ISO/IEC 15693, ISO/IEC 18000-3).

The transmit branch consists of a demodulation circuit 97, a modulator circuit 9, an oscillator 8 (e.g. 13.56 MHz), a controller 95, and a transmitter amplifier 80 connected to the antenna 3. The demodulation circuit 98 can consist for example of a rectifier 96 and a threshold switch 97.

In the receive mode a voltage is induced in the antenna 3 by the magnetic field of a remote RFID reading device. Together with the capacitor 81 the antenna 3 forms a parallel-resonant circuit whose resonant frequency corresponds approximately to the transmitting frequency of the RFID reading device. The voltage thus available on the resonant circuit is supplied to the input amplifier 91 via the switch 7. Via a gain control 92 the gain factor of the input amplifier 91 is now so adjusted that the output amplitude of the voltage amplified by the input amplifier 91 remains largely constant. The time constant of the control is preferably so adjusted here that the output voltage of the amplifier 91 remains constant in case of varying distance from the reading device (i.e. different levels of induced voltage in the coil 3), but modulation signals (e.g. 10% ASK with 106 kbit/s) are not suppressed by excessively fast control.

The output signal of the amplifier 91 is supplied to a further amplifier, preferably a push-pull amplifier (V+, V−). The output signal of the push-pull amplifier is supplied to the connections of the contactless RFID chip CL via (at least) one series resistor 93. The amplitude of the output signal of the push-pull amplifier V+/V− is so selected here that the RFID chip CL can be supplied with sufficient energy for operation by the output signal.

The RFID chip CL thus receives a signal that corresponds to the signal of the remote reading device in time response and is proportional thereto in amplitude. The RFID chip is thus also able to receive, evaluate and optionally process commands sent from said reading device.

As soon as the RFID chip CL has received and processed a command, it tries to send a response back to the remote reading device. For this purpose the RFID chip normally uses a load modulation, i.e. an additional parallel resistor in the chip is switched on and off in time with the modulation signal. This leads to measurable fluctuations in the voltage drop across the resistors 93, 94. In other words, the HF alternating voltage at the connections is modulated in amplitude. By the demodulator circuit 98 this amplitude-modulated alternating voltage signal is demodulated and the original modulation signal thus reconstructed again.

The demodulation circuit 98 consists in the simplest case of a bridge rectifier 96 and a threshold switch 97. A further possibility is to implement the demodulation circuit using an analog-to-digital converter and downstream signal processing (e.g. a DSP processor with software). In RFID systems working with load modulation with a subcarrier, filtering out a subcarrier band resulting from the load modulation (upper subcarrier band 13.56 MHz+$f_{HT}$, lower subcarrier band −13.56 MHz−$f_{HT}$) and down-stream processing is also possible.

The modulation signal reconstructed by the demodulation circuit 97 is also supplied to a controller 95. The latter switches the inventive circuit with the first edge of the modulation signal to a transmit mode without delay if possible, so that the data generated by the RFID chip CL can also be transferred to the remote reading device. For this purpose, the switch 7 is first switched from the antenna 3 to the oscillator 8 (13.56 MHz). This is necessary to be able to keep supplying the RFID chip CL with an alternating voltage of the right frequency. At the same time the amplifier 80 is activated by the controller 95.

The reconstructed modulation signal and the signal of the oscillator 8 are supplied to the modulator circuit 9. The exact function of such a circuit has already been described in detail. The output signal of the modulator circuit 9 is supplied to the amplifier 80 and sent via the antenna 3 to the remote reading device.

If the controller 95 is no longer supplied a modulation signal for a defined time t, it is provided according to the invention that it automatically switches the inventive circuit back to the receive mode. The length of the time t is expediently adjusted between the duration of a bit (ISO 14443-A: ~10 μs) and the frame delay time (minimal time until the next signal from a reading device, ISO 14443 A: ~86 μs).

An important role is played by the signal received by the controller 95 from the receive branch (91, 92 V+, V−). When a reading device sends data to the trans-ponder unit by means of an amplitude modulation of the emitted field (e.g. 150/IEC 14443-A: 100% ASK, ISO/IEC 14443-B: 10% ASK), this modulation is also passed on to the transponder chip CL. The demodulation circuit 98 can possibly not distinguish here between a modulation signal from a reading device and a load modulation of the RFID chip CL, since both are expressed as amplitude modulation of the HF signal on the connections of the RFID chip CL.

However, a load modulation of the transponder chip CL is recognizable exclusively on the connections, but a modulation signal of the reading device already in the receive branch (91, 92, V+, V−) of the inventive circuit. It is therefore provided to switch the inventive circuit to the transmit mode only when a modulation signal (amplitude modulation) can be detected exclusively on the connections of the RFID chip CL and not in the receive branch, since only in this case is a load modulation involved. This is indicated in FIG. 9 by the signal fed into the controller 95 from the receive branch (91, 92, V+, V−).

A second way of distinguishing is to evaluate the modulation depth of the signal on the connections of the RFID chip. By load modulation a modulation depth less than 100% is obtained. In the breadboard setup approx. 25% was determined, other values arise from combining different resistors 93, 94 with different RFID chips CL. It is therefore provided to distinguish between the load modulation and the modulation of the reading device by determining modulation depth with reference to given switching thresholds. If the strength of the modulation signal is above a first, high threshold, a signal from the reading device is present. If the modulation signal is smaller than the first switching threshold and optionally greater than a second switching threshold, however, it is recognized that a load modulation is present. A switch-over to the transmit mode is effected if the modulation was caused by a load modulation.

Figure 10:
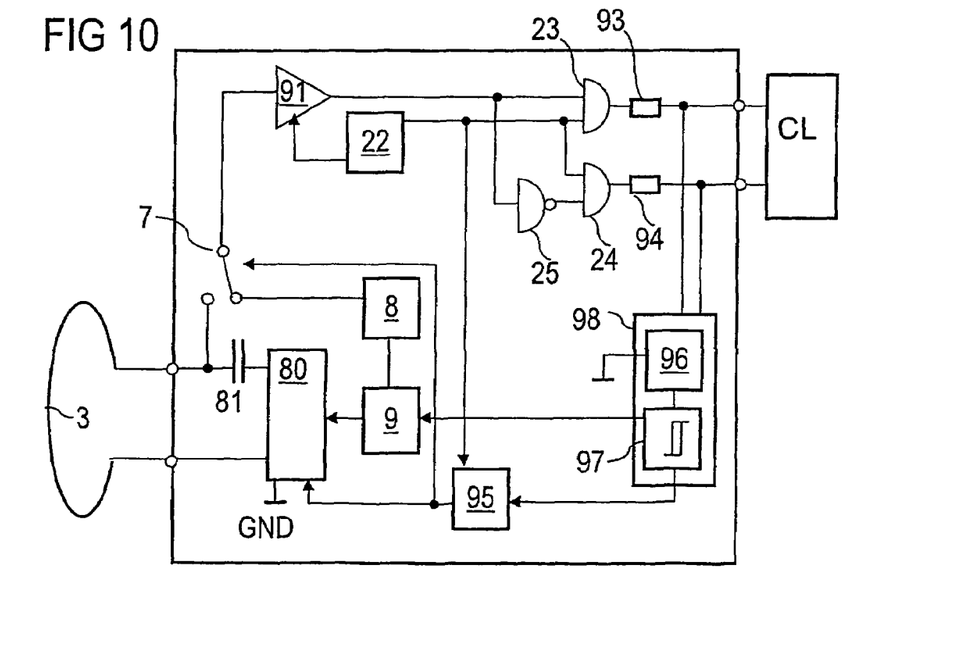

FIG. 10 shows schematically the structure of a simplified interface module for connection to a chip with a conventional HF interface.

In this embodiment, a TTL driver in push-pull circuit 23, 24, 25 is used instead of a linear amplifier. A modulation detector 22 is used for recognizing an amplitude modulation sent from the reading device and, according to the invention, switches both outputs of the push-pull circuits 23, 24 to a low level during the modulation pulses of the reading device, which performs a 100% ASK modulation. However, if the transponder chip CL and the reading device use a 10% ASK modulation for data transfer (for example according to ISO/IEC 14443-B), it is provided that the modulation detector 22 switches between two push-pull circuits with a different level of the output signal in time with the received modulation signals.

Figure 11:
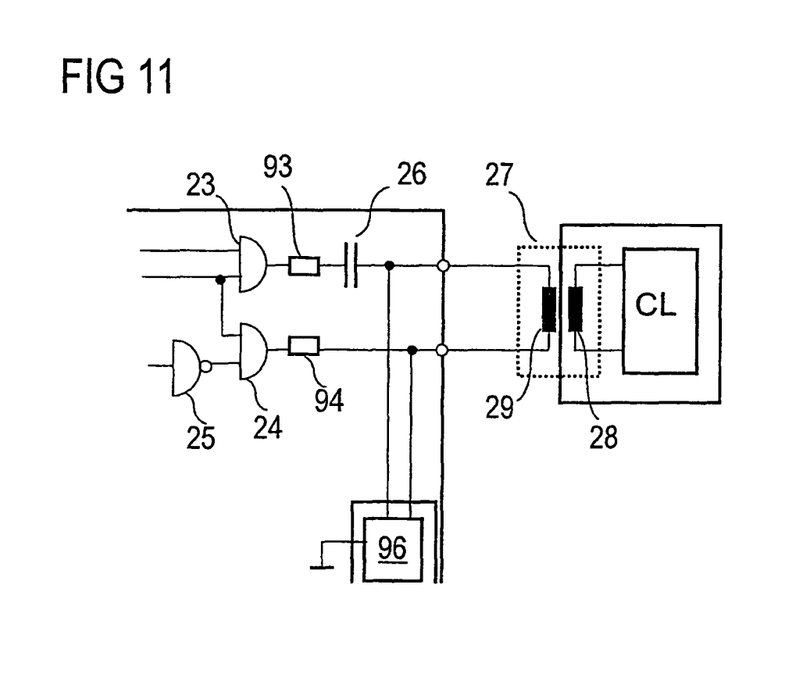

A further possibility of coupling the transponder chip CL is a capacitive or also inductive coupling. FIG. 11 shows the relevant detail of a simplified interface module for inductive connection to a transponder.

For an inductive coupling, the circuit has an additional antenna 29 which can be made to resonate with the working frequency (e.g. 13.56 MHz) by means of a capacitor 26. A transponder comprising a transponder chip CL and an antenna 28 is positioned in immediate proximity to the antenna 29, so as to obtain the best possible magnetic coupling between the antennas 28 and 29. A load modulation of the transponder chip CL can also be detected easily with this arrangement.

The interface module adapted to be coupled inductively and a further antenna connected thereto (see reference sign 3 in FIG. 10) can be disposed in a terminal. The range of an ordinary transponder can be increased with the help of such a terminal. The owner of a mobile telephone could for example set up a communication between his transponder and a reading device that is unfavorably disposed or inconvenient to reach for other reasons by holding the transponder against his mobile telephone provided according to the invention with an interface module adapted to be coupled inductively.

The following table shows results of range measurements that were taken:

| Transponder | Antenna size | Range |
|---|---|---|
| Contactless chip card | 80 × 50 mm$^2$ | 7 cm |
| Optimized digital ring modulator XOR | 80 × 50 mm$^2$ | 50 cm |
| Optimized digital ring modulator XOR | 20 × 20 mm$^2$ | 25 cm |

As can be seen from the table, long communication ranges are achieved with the inventive method even with very small antennas.

It was ascertained that small antennas, e.g. in a SIM card with its own antenna (approx. 15×25 mm$^2$), obtain very low read ranges with a conventional load modulation. It is frequently even impossible to communicate with a contactless reading device when the SIM card with an antenna is disposed for example in a mobile telephone. If one of the inventive transmitters is used in a mobile terminal the range is not clearly increased. Moreover, it can be advantageously exploited that mobile terminals such as mobile telephones, PDAs, etc., have their own energy supply (battery) which can also be used for supplying an inventive circuit.

The described solutions can be seen as an alternative to using NFC units which alternately emit their field in the active mode of the NFC system. However, the present solutions can also serve as an advantageous addition to the passive mode in an NFC system.

Thus, an NFC unit could be adapted to behave according to the present solutions in its passive mode in the role ("being card") in which the NFC unit is to perform a load modulation. The NFC unit could for example always act as a component actively emitting its own field. Likewise, the NFC unit could also distinguish, and optionally switch, between a first submode corresponding to a conventional load modulation and an actively sending, second submode in which the load modulation is simulated. A thus improved NFC unit can also communicate with ordinary RFID reading devices over a higher range with the help of the changed passive operating mode. Since NFC units will already have certain units—such as an oscillator, an amplifier and a controller—for independent sending in their conventional active mode, comparatively few modifications of an NFC circuit are required to realize a circuit according to the present application in an NFC unit.

To make the present description more readable, the individual advantageous features and arrangements have not been shown, discussed and combined in every embodiment. Aspects of the individual embodiments are combinable with each other, as will be clear with reference to the examples in the following paragraphs.

The individual functional components of the transponder unit—antenna, interface unit, chip and optionally voltage supply unit—can be disposed in all sorts of combinations separately from each other or integrated jointly in one unit. An inventive transponder unit can be formed for example as a specially designed transponder, in a portable data carrier, in particular a chip card, which optionally has a battery. A portable data carrier, in particular SIM card, with a chip and an interface unit can be connected in a mobile terminal to an external voltage source and/or an external antenna. The interface unit can be disposed in a terminal, connected to its own or an external antenna, and communicate with a chip which is disposed reversibly or firmly in the terminal or temporarily on the terminal.

A suitable modulator circuit can be selected in the above-mentioned component combinations, for example, with respect to the application case. The different kinds of subcarrier modulators and carrier frequency modulators shown can also be combined in a modulator theoretically as desired.

Whether a passive operating mode is provided, and under which conditions, and how a switchover is effected, are likewise selectable depending on the application case.

The invention claimed is:

1. A method for transferring data from a transponder unit of a portable data carrier to a reading device which receives data from transponders by load modulation of a field of the reading device, comprising the steps:

the transponder unit, in a first operating mode, generating a modulated transponder field and emitting the modulated transponder field containing the data to be transferred as a first signal which emulates load modulation of the reading device field by a transponder, wherein a ring modulator of the transponder unit suppresses a carrier frequency signal generated by an oscillator of the transponder unit in favor of a subcarrier signal modulated with the data to be transferred by supplying the carrier frequency into a first input end of the ring modulator and by supplying the subcarrier signal modulated with the data to be transferred into a second input end of the ring modulator, wherein the transponder unit in a second operating mode performs load modulation for transferring the data to the reading device, wherein in the second operating mode the field of the reading device is loaded by the transponder unit and a second signal containing the data to be transferred from the transponder unit is received through coupled modulation of the field of the reading device, and wherein the portable data carrier is a chip card.

2. The method according to claim 1, wherein the transponder unit uses the second operating mode within a passive communication range of the reading device, and uses the first operating mode outside the passive communication range.

3. The method according to claim 1, including the steps of: receiving an input signal from the reading device, demodulating the input signal to extract received data from the input signal, and supplying the extracted data to a controller, whereupon the data to be transferred to the reading device is generated in the controller.

4. The method according to claim 1, including the step of generating the frequency of the subcarrier signal by binary division of the frequency of the oscillator signal.

5. The method according to claim 1, wherein the data to be transferred to the reading devices is supplied to a load modulator of the transponder unit or the ring modulator of the transponder unit.

6. The method according to claim 1, including the step of limiting, by means of a voltage limiter, a voltage induced on an antenna of the transponder unit by the reading device.

7. The method according to claim 1, including the step of coupling the oscillator signal with a signal received from the reading device via a phase locked loop circuit.

8. The method according to claim 1, including the step of amplifying the first signal before it is transmitted to the reading device.

9. A transponder unit of a portable data carrier configured to transfer data to a reading device which receives data from transponders by load modulation of a field of the reading device, comprising:

a ring modulator, in a first operating mode, configured to generate and emit a modulated transponder field containing the data to be transferred as a first signal which emulates load modulation of the reading device field by a transponder, wherein the ring modulator of the transponder unit is configured to supress a carrier frequency signal generated by an oscillator in the transponder unit in favor of a subcarrier signal modulated with the data to be transferred by supplying the carrier frequency into a first input end of the ring modulator and by supplying the subcarrier signal modulated with the data to be transferred into a second input end of the ring modulator, wherein the transponder unit in a second operating mode performs load modulation for transferring the data to the reading device, wherein in the second operating mode the field of the reading device is loaded by the transponder unit and a second signal containing the data to be transferred from the transponder unit is received through coupled modulation of the field of the reading device, and wherein the portable data carrier is a chip card.

10. The transponder unit according to claim 9, wherein the transponder unit is configured to use the second operating mode within a passive communication range of the reading device and to use the first operating mode outside the passive communication range.

11. The transponder unit according to claim 9, including at least one antenna; a receiver configured to demodulate and extract data from a signal received by the at least one antenna transmitted from the reading device; and an electronic circuit which is set up to process the extracted data and to generate data to be transferred to the reading device.

12. The transponder unit according to claim 9, including an energy supply associated with the transponder unit.

13. The transponder unit according to claim 9, including a load modulator and a switch-over device which is set up to switch, depending on a level of a voltage induced on an antenna, between the load modulator and the ring modulator.

14. The transponder unit according to claim 13, wherein the switch-over device switches automatically from the ring modulator to the load modulator when the induced voltage exceeds a given value.

15. The transponder unit according to claim 9, including a voltage limiter for limiting a voltage induced on an antenna.

16. The transponder unit according to claim 9, wherein the oscillator is coupled via a phase locked loop circuit to a signal received from the reading device which serves as a reference signal for the oscillator.

17. The transponder unit according to claim 9, comprising a device arranged to temporarily deactivate the transponder unit.

18. A value document, comprising a transponder unit of a portable data carrier configured to transfer data to a reading device which receives data from transponders by load modulation of a field of the reading device, comprising:

a ring modulator, in a first operating mode, configured to generate and emit a modulated transponder field containing the data to be transferred as a first signal which emulates load modulation of the reading device field by the transponder, wherein the ring modulator of the transponder unit is configured to supress a carrier frequency signal generated by an oscillator in the transponder unit in favor of a subcarrier signal modulated with the data to be transferred by supplying the carrier frequency into a first input end of the ring modulator and by supplying the subcarrier signal modulated with the data to be transferred into a second input end of the ring modulator, and wherein the transponder unit in a second operating mode performs load modulation for transferring the data to the reading device, wherein in the second operating mode the field of the reading device is loaded by the transponder unit and a second signal containing the data to be transferred from the transponder unit is received through coupled modulation of the field of the reading device.

* * * * *